United States Patent
Nicholls

(10) Patent No.: US 9,761,266 B2
(45) Date of Patent: Sep. 12, 2017

(54) DATA STORAGE DEVICE OPTIMIZING SPINDLE MOTOR POWER WHEN TRANSITIONING INTO A POWER FAILURE MODE

(71) Applicant: Western Digital Technologies, Inc., Irvine, CA (US)

(72) Inventor: Michael T. Nicholls, Laguna Hills, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 14/987,581

(22) Filed: Jan. 4, 2016

(65) Prior Publication Data
US 2016/0180877 A1    Jun. 23, 2016

Related U.S. Application Data

(62) Division of application No. 14/582,068, filed on Dec. 23, 2014, now Pat. No. 9,230,593.

(51) Int. Cl.
 *G11B 5/09* (2006.01)
 *G11B 19/20* (2006.01)
 *G11B 21/12* (2006.01)

(52) U.S. Cl.
 CPC .......... *G11B 19/20* (2013.01); *G11B 19/2081* (2013.01); *G11B 21/12* (2013.01)

(58) Field of Classification Search
 None
 See application file for complete search history.

(56) References Cited

U.S. PATENT DOCUMENTS

| | | | |
|---|---|---|---|
| 4,011,588 A * | 3/1977 | Yasuda | G11B 15/42 360/71 |
| 4,215,301 A | 7/1980 | Mason | |
| 4,755,892 A | 7/1988 | Carteau et al. | |
| 5,182,685 A | 1/1993 | Krause et al. | |
| 5,327,059 A | 7/1994 | Truong et al. | |
| 5,414,861 A | 5/1995 | Horning | |
| 5,438,549 A | 8/1995 | Levy | |

(Continued)

FOREIGN PATENT DOCUMENTS

WO    2010151347    12/2010

OTHER PUBLICATIONS

Timothy A. Ferris, et al., U.S. Appl. No. 13/316,128, filed Dec. 9, 2011, 15 pages.

(Continued)

*Primary Examiner* — Peter Vincent Agustin

(57) ABSTRACT

A data storage device is disclosed comprising a head actuated over a disk, and a spindle motor configured to rotate the disk, wherein the spindle motor comprises a plurality of windings. The windings of the spindle motor are commutated based on a commutation sequence while applying a driving voltage to each winding, wherein the driving voltage comprises an operating polarity during normal operation. When a supply voltage falls below a threshold while the spindle motor is rotating the disk, the spindle motor is configured into a power generator by at least reversing the polarity of the driving voltage for an interval and then reversing the polarity of the driving voltage back to the operating polarity.

9 Claims, 5 Drawing Sheets

(56) References Cited

U.S. PATENT DOCUMENTS

| | | | |
|---|---|---|---|
| 5,442,455 A * | 8/1995 | Hioki | G11B 7/0037 386/222 |
| 5,461,518 A | 10/1995 | Saiki et al. | |
| 5,495,372 A | 2/1996 | Bahlmann et al. | |
| 5,504,402 A | 4/1996 | Menegoli | |
| 5,889,629 A | 3/1999 | Patton, III | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,236,800 B1 * | 5/2001 | Nishima | G11B 5/0086 386/289 |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,305,628 B1 | 10/2001 | Thompson et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,462,896 B1 | 10/2002 | Codilian et al. | |
| 6,476,996 B1 | 11/2002 | Ryan | |
| 6,484,577 B1 | 11/2002 | Bennett | |
| 6,493,169 B1 | 12/2002 | Ferris et al. | |
| 6,496,324 B1 | 12/2002 | Golowka et al. | |
| 6,498,698 B1 | 12/2002 | Golowka et al. | |
| 6,507,450 B1 | 1/2003 | Elliott | |
| 6,534,936 B2 | 3/2003 | Messenger et al. | |
| 6,538,839 B1 | 3/2003 | Ryan | |
| 6,545,835 B1 | 4/2003 | Codilian et al. | |
| 6,549,359 B1 | 4/2003 | Bennett et al. | |
| 6,549,361 B1 | 4/2003 | Bennett et al. | |
| 6,560,056 B1 | 5/2003 | Ryan | |
| 6,568,268 B1 | 5/2003 | Bennett | |
| 6,574,062 B1 | 6/2003 | Bennett et al. | |
| 6,577,465 B1 | 6/2003 | Bennett et al. | |
| 6,594,102 B1 | 7/2003 | Kanda et al. | |
| 6,614,615 B1 | 9/2003 | Ju et al. | |
| 6,614,618 B1 | 9/2003 | Sheh et al. | |
| 6,636,377 B1 | 10/2003 | Yu et al. | |
| 6,690,536 B1 | 2/2004 | Ryan | |
| 6,693,764 B1 | 2/2004 | Sheh et al. | |
| 6,707,635 B1 | 3/2004 | Codilian et al. | |
| 6,710,953 B1 | 3/2004 | Vallis et al. | |
| 6,710,966 B1 | 3/2004 | Codilian et al. | |
| 6,714,371 B1 | 3/2004 | Codilian | |
| 6,714,372 B1 | 3/2004 | Codilian et al. | |
| 6,724,564 B1 | 4/2004 | Codilian et al. | |
| 6,731,450 B1 | 5/2004 | Codilian et al. | |
| 6,735,041 B1 | 5/2004 | Codilian et al. | |
| 6,738,220 B1 | 5/2004 | Codilian | |
| 6,747,837 B1 | 6/2004 | Bennett | |
| 6,760,186 B1 | 7/2004 | Codilian et al. | |
| 6,788,483 B1 | 9/2004 | Ferris et al. | |
| 6,791,785 B1 | 9/2004 | Messenger et al. | |
| 6,795,268 B1 | 9/2004 | Ryan | |
| 6,819,518 B1 | 11/2004 | Melkote et al. | |
| 6,826,006 B1 | 11/2004 | Melkote et al. | |
| 6,826,007 B1 | 11/2004 | Patton, III | |
| 6,847,502 B1 | 1/2005 | Codilian | |
| 6,850,383 B1 | 2/2005 | Bennett | |
| 6,850,384 B1 | 2/2005 | Bennett | |
| 6,856,556 B1 | 2/2005 | Hajeck | |
| 6,865,049 B1 | 3/2005 | Codilian et al. | |
| 6,867,944 B1 | 3/2005 | Ryan | |
| 6,876,508 B1 | 4/2005 | Patton, III et al. | |
| 6,882,496 B1 | 4/2005 | Codilian et al. | |
| 6,885,514 B1 | 4/2005 | Codilian et al. | |
| 6,900,958 B1 | 5/2005 | Yi et al. | |
| 6,900,959 B1 | 5/2005 | Gardner et al. | |
| 6,903,897 B1 | 6/2005 | Wang et al. | |
| 6,914,740 B1 | 7/2005 | Tu et al. | |
| 6,914,743 B1 | 7/2005 | Narayana et al. | |
| 6,920,004 B1 | 7/2005 | Codilian et al. | |
| 6,924,959 B1 | 8/2005 | Melkote et al. | |
| 6,924,960 B1 | 8/2005 | Melkote et al. | |
| 6,924,961 B1 | 8/2005 | Melkote et al. | |
| 6,934,114 B1 | 8/2005 | Codilian et al. | |
| 6,934,135 B1 | 8/2005 | Ryan | |
| 6,937,420 B1 | 8/2005 | McNab et al. | |
| 6,937,423 B1 | 8/2005 | Ngo et al. | |
| 6,952,322 B1 | 10/2005 | Codilian et al. | |
| 6,954,324 B1 | 10/2005 | Tu et al. | |
| 6,958,881 B1 | 10/2005 | Codilian et al. | |
| 6,963,465 B1 | 11/2005 | Melkote et al. | |
| 6,965,488 B1 | 11/2005 | Bennett | |
| 6,967,458 B1 | 11/2005 | Bennett et al. | |
| 6,967,811 B1 | 11/2005 | Codilian et al. | |
| 6,970,319 B1 | 11/2005 | Bennett et al. | |
| 6,972,539 B1 | 12/2005 | Codilian et al. | |
| 6,972,540 B1 | 12/2005 | Wang et al. | |
| 6,972,922 B1 | 12/2005 | Subrahmanyam et al. | |
| 6,975,480 B1 | 12/2005 | Codilian et al. | |
| 6,977,789 B1 | 12/2005 | Cloke | |
| 6,980,389 B1 | 12/2005 | Kupferman | |
| 6,987,636 B1 | 1/2006 | Chue et al. | |
| 6,987,639 B1 | 1/2006 | Yu | |
| 6,989,954 B1 | 1/2006 | Lee et al. | |
| 6,992,848 B1 | 1/2006 | Agarwal et al. | |
| 6,992,851 B1 | 1/2006 | Cloke | |
| 6,992,852 B1 | 1/2006 | Ying et al. | |
| 6,995,941 B1 | 2/2006 | Miyamura et al. | |
| 6,999,263 B1 | 2/2006 | Melkote et al. | |
| 6,999,267 B1 | 2/2006 | Melkote et al. | |
| 7,006,320 B1 | 2/2006 | Bennett et al. | |
| 7,016,134 B1 | 3/2006 | Agarwal et al. | |
| 7,023,637 B1 | 4/2006 | Kupferman | |
| 7,023,640 B1 | 4/2006 | Codilian et al. | |
| 7,027,256 B1 | 4/2006 | Subrahmanyam et al. | |
| 7,027,257 B1 | 4/2006 | Kupferman | |
| 7,035,026 B2 | 4/2006 | Codilian et al. | |
| 7,038,522 B2 | 5/2006 | Fauh et al. | |
| 7,046,472 B1 | 5/2006 | Melkote et al. | |
| 7,050,249 B1 | 5/2006 | Chue et al. | |
| 7,050,254 B1 | 5/2006 | Yu et al. | |
| 7,050,258 B1 | 5/2006 | Codilian | |
| 7,054,098 B1 | 5/2006 | Yu et al. | |
| 7,061,714 B1 | 6/2006 | Yu | |
| 7,064,918 B1 | 6/2006 | Codilian et al. | |
| 7,068,451 B1 | 6/2006 | Wang et al. | |
| 7,068,459 B1 | 6/2006 | Cloke et al. | |
| 7,068,461 B1 | 6/2006 | Chue et al. | |
| 7,068,463 B1 | 6/2006 | Ji et al. | |
| 7,088,547 B1 | 8/2006 | Wang et al. | |
| 7,095,579 B1 | 8/2006 | Ryan et al. | |
| 7,110,208 B1 | 9/2006 | Miyamura et al. | |
| 7,110,214 B1 | 9/2006 | Tu et al. | |
| 7,113,362 B1 | 9/2006 | Lee et al. | |
| 7,113,365 B1 | 9/2006 | Ryan et al. | |
| 7,116,505 B1 | 10/2006 | Kupferman | |
| 7,126,781 B1 | 10/2006 | Bennett | |
| 7,126,857 B2 | 10/2006 | Hajeck | |
| 7,142,400 B1 | 11/2006 | Williams et al. | |
| 7,158,329 B1 | 1/2007 | Ryan | |
| 7,161,757 B1 | 1/2007 | Krishnamoorthy et al. | |
| 7,180,703 B1 | 2/2007 | Subrahmanyam et al. | |
| 7,184,230 B1 | 2/2007 | Chue et al. | |

(56) References Cited

U.S. PATENT DOCUMENTS

| | | |
|---|---|---|
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,409,590 B2 | 8/2008 | Moshayedi et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,623,316 B1 | 11/2009 | Rana et al. |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,733,712 B1 | 6/2010 | Walston et al. |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,808,200 B2 | 10/2010 | Liu et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 7,974,038 B2 | 7/2011 | Krishnan et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,471,509 B2 | 6/2013 | Bonvin |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |

(56) References Cited

U.S. PATENT DOCUMENTS

| | | |
|---|---|---|
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,422 B1 | 5/2014 | Agness et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 8,982,501 B1 | 3/2015 | Nicholls et al. |
| 9,230,593 B1 * | 1/2016 | Nicholls ............... G11B 21/12 |
| 9,343,102 B1 * | 5/2016 | Nicholls ............ G11B 19/2081 |
| 9,355,676 B1 * | 5/2016 | Nicholls .................. H02P 3/14 |
| 2001/0024339 A1 | 9/2001 | Yaegashi |
| 2002/0141102 A1 | 10/2002 | Kusumoto |
| 2003/0184907 A1 * | 10/2003 | Li ........................... G11B 5/54 360/73.03 |
| 2004/0080858 A1 | 4/2004 | Suzuki |
| 2005/0218853 A1 * | 10/2005 | Kokami ................ G05B 11/28 318/599 |
| 2006/0069870 A1 | 3/2006 | Nicholson et al. |
| 2007/0033433 A1 | 2/2007 | Pecone et al. |
| 2008/0111423 A1 | 5/2008 | Baker et al. |
| 2009/0140575 A1 | 6/2009 | McGee et al. |
| 2009/0206657 A1 | 8/2009 | Vuk et al. |
| 2009/0289607 A1 | 11/2009 | Mentelos |
| 2010/0035085 A1 | 2/2010 | Jung et al. |
| 2010/0052625 A1 | 3/2010 | Cagno et al. |
| 2010/0066431 A1 | 3/2010 | Carter |
| 2010/0302664 A1 | 12/2010 | Heo et al. |
| 2011/0198931 A1 | 8/2011 | Ly |
| 2012/0284493 A1 | 11/2012 | Lou et al. |
| 2013/0120870 A1 | 5/2013 | Zhou et al. |
| 2013/0148240 A1 | 6/2013 | Ferris et al. |
| 2016/0180877 A1 * | 6/2016 | Nicholls ................ G11B 21/12 360/71 |

OTHER PUBLICATIONS

Notice of Allowance dated Sep. 2, 2015 from U.S. Appl. No. 14/582,068, 8 pages.

Office Action dated May 20, 2015 from U.S. Appl. No. 14/582,068, 6 pages.

* cited by examiner

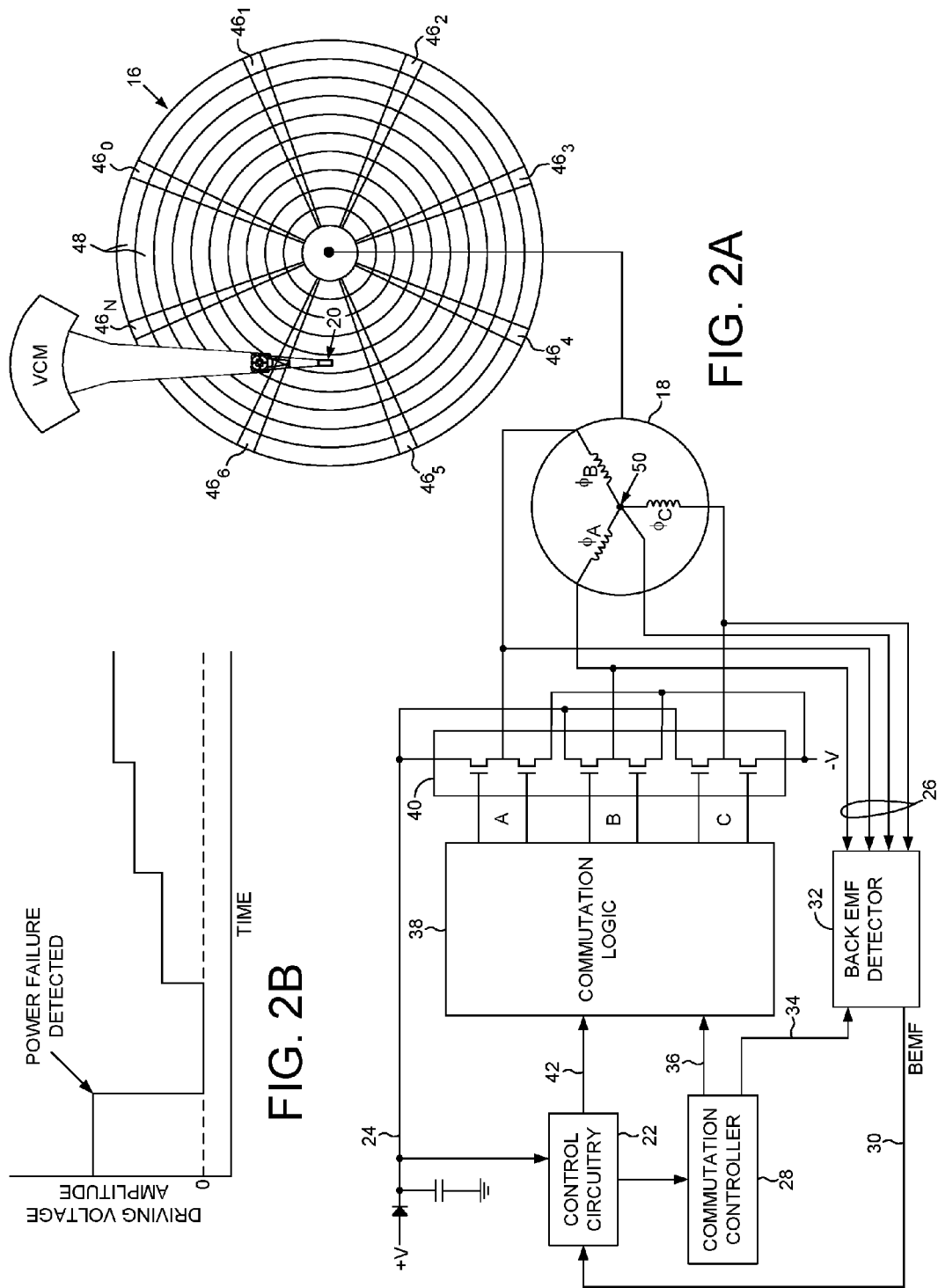

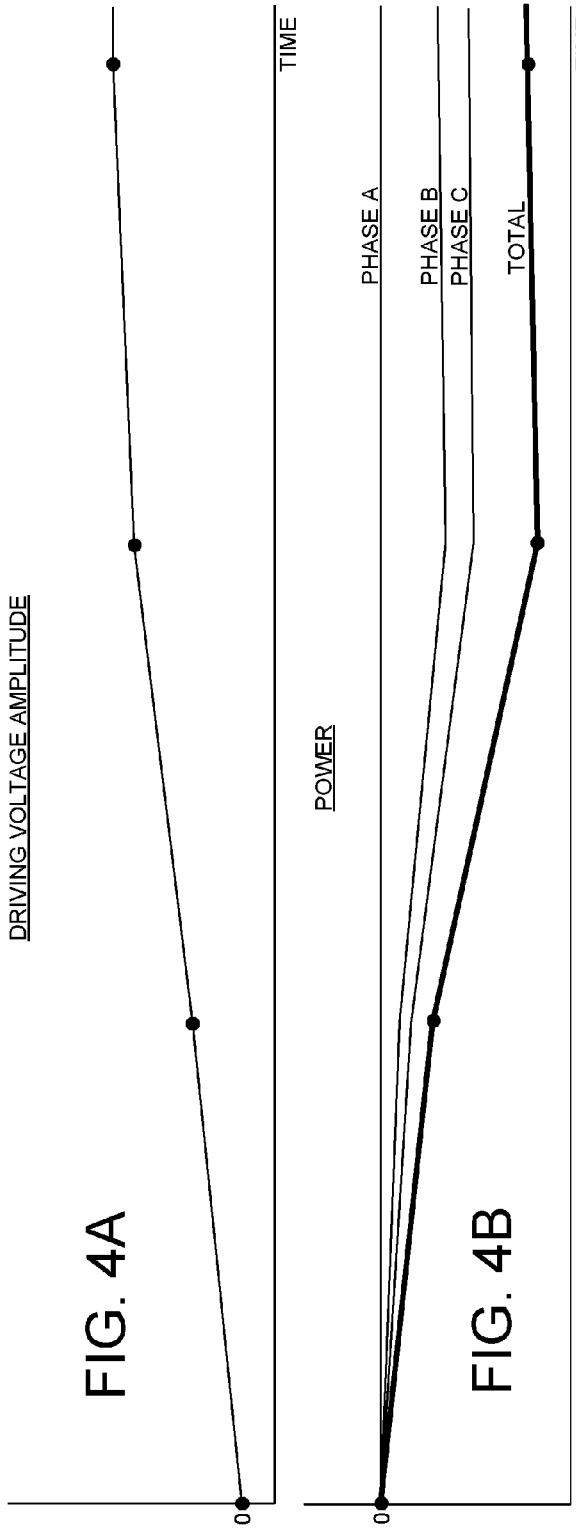
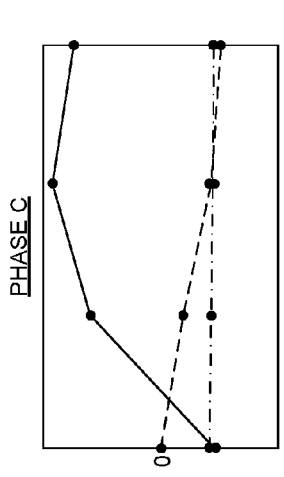
FIG. 4A
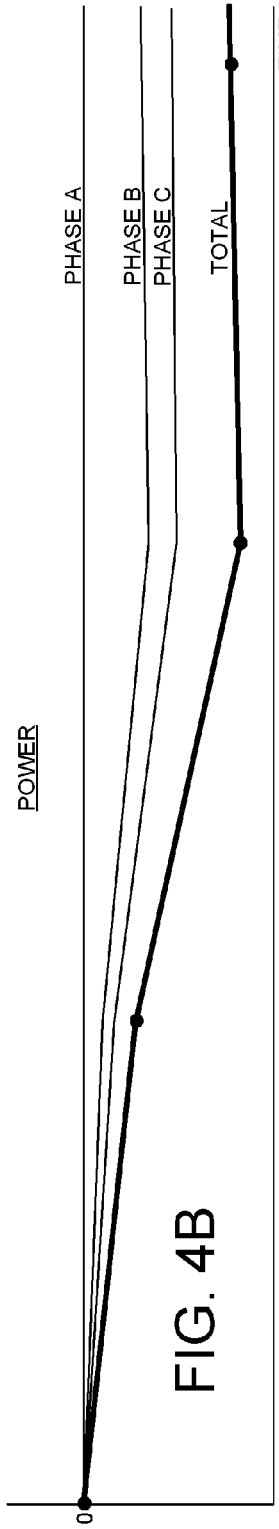
FIG. 4B
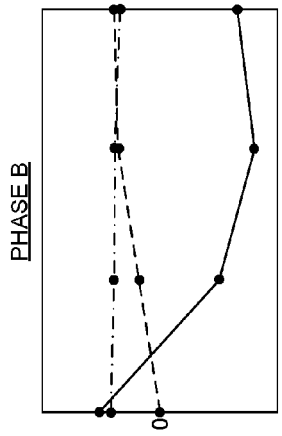
FIG. 4D
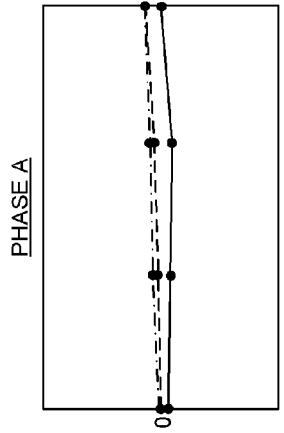
FIG. 4C

DATA STORAGE DEVICE OPTIMIZING SPINDLE MOTOR POWER WHEN TRANSITIONING INTO A POWER FAILURE MODE

CROSS REFERENCE TO RELATED APPLICATIONS

This application is a divisional of U.S. patent application Ser. No. 14/582,068, filed on Dec. 23, 2014, which is hereby incorporated by reference in its entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

The disk 2 is typically rotated by a spindle motor at a high speed so that an air bearing forms between the head and the disk surface. A commutation controller applies a driving signal to the windings of the spindle motor using a particular commutation sequence in order to generate a rotating magnetic field that causes the spindle motor to rotate. Prior art disk drives have typically controlled the commutation of the windings by measuring a zero-crossing frequency of a back electromotive force (BEMF) voltage generated by the windings of the spindle motor. Prior art disk drives may also utilize the BEMF voltage generated by the spindle motor as a power source during power failure to assist with power down operations, such as unloading the head onto a ramp. For example, a known technique to generate power from the spindle motor during a power failure is to short the windings to build current due do the inductance, and then release the short so that the fly-back current boosts the supply voltage. However, this technique may not optimize the power provided by the spindle motor, particularly when transitioning the spindle motor from normal operation into a power generator when a power failure is detected.

BRIEF DESCRIPTION OF THE DRAWINGS

FIG. 2A shows a data storage device in the form of a disk drive comprising a head actuated over a disk, and control circuitry powered by a supply voltage and configured to commutate windings of a spindle motor.

FIG. 2B shows an embodiment wherein when the supply voltage falls below a threshold due to a power failure, the spindle motor is configured into a power generator by at least reducing an amplitude of a driving voltage applied to the windings to substantially zero and then incrementally increasing the amplitude of the driving voltage by at least two steps toward an operating amplitude.

FIGS. 4A-4E show signal waveforms illustrating an embodiment for step increasing the amplitude of the windings driving voltages during the power failure procedure.

DETAILED DESCRIPTION

Figure 1:
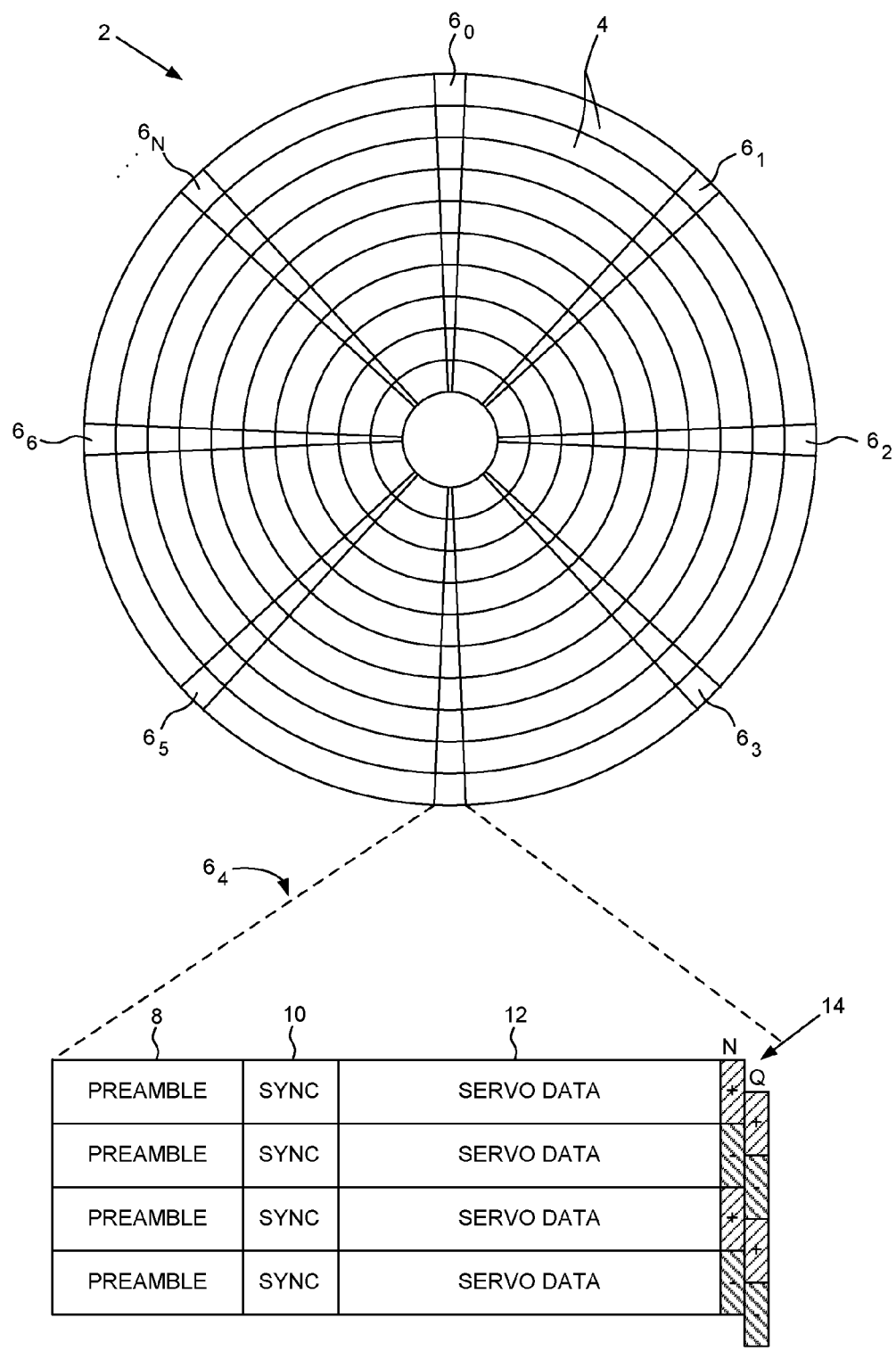
FIG. 1 shows a prior art disk format comprising a plurality of servo tracks defined by servo sectors.

FIG. 2A shows a data storage device in the form of a disk drive comprising a disk 16, a spindle motor 18 configured to rotate the disk 16, wherein the spindle motor comprises a plurality of windings, and a head 20 actuated over the disk 16. The disk drive further comprises control circuitry 22 powered by a supply voltage 24, wherein the control circuitry 22 is configured to commutate the windings based on a commutation sequence while applying a driving voltage to each winding, wherein the driving voltage comprises an operating amplitude during normal operation. When the supply voltage falls below a threshold, the control circuitry 22 configures the spindle motor 18 into a power generator by at least reducing the amplitude of the driving voltage to substantially zero and then incrementally increasing the amplitude of the driving voltage by at least two steps toward the operating amplitude an example of which is illustrated in FIG. 2B.

In one embodiment shown in FIG. 2A, a back electromotive force (BEMF) voltage 26 generated by the windings of the spindle motor 18 may be processed in order to drive the commutation sequence of a commutation controller 28.

The control circuitry 22 may process a BEMF signal 30 which may be a square wave representing the BEMF zero-crossings as detected by a BEMF detector 32. The commutation controller 28 may generate a control signal 34 which configures the BEMF detector 32 to detect the zero-crossing of the BEMF voltage generated by each winding as the disk rotates. The commutation controller 28 also generates a control signal 36 applied to commutation logic 38. In the embodiment of FIG. 2A, the commutation logic 38 is configured by the control signal 36 to control the state of switches 40 in order to drive the windings with driving voltages +V and −V. The commutation logic 38 may operate in any suitable manner, such as by driving the switches 40 as linear amplifiers that apply continuous-time sinusoidal voltages to the windings. In another embodiment, the commutation logic 38 may drive the switches 40 using pulse wide modulation (PWM), such as using square wave PWM, trapezoidal PWM, or sinusoidal PWM. Regardless as to how the windings are driven, the commutation controller 28 generates the control signal 36 so that the windings are commutated at the correct periods, thereby generating the desired rotating magnetic field that causes the spindle motor to rotate. In one embodiment, the control circuitry 22 may generate a control signal 42 that controls the effective amplitude of the driving voltages (continuous or PWM), thereby controlling the speed of the spindle motor 18.

Figure 3A:
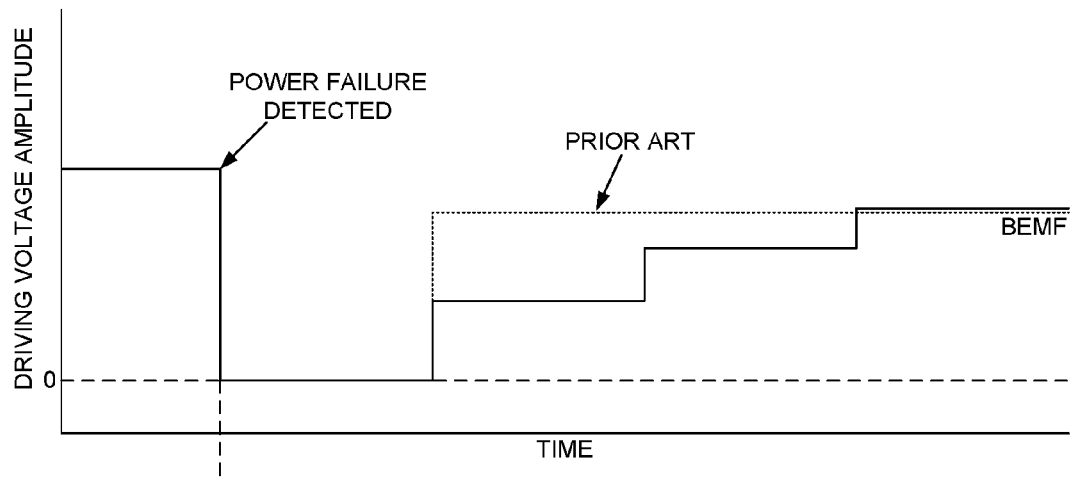
FIG. 3A shows an embodiment wherein the amplitude of the driving voltage is step incremented so as to increase the power generated by the spindle motor earlier during the power failure procedure.

If a power failure occurs while the disk 16 is spinning, there is residual kinetic energy as the disk 16 continues to rotate the spindle motor 18, and therefore the spindle motor 18 can be converted into a power generator used to power the control circuitry 22 while executing power down operations, such as completing a current write operation to the disk 16 before unloading the head 20 onto a ramp. FIG. 3A shows a prior art technique for generating power from the spindle motor 18 by shorting the windings for an interval to build current due do the inductance, and then releasing the short so that the fly-back current boosts the supply voltage 24. For example, in one embodiment when a power failure occurs the negative supply voltage −V in FIG. 2A may be shorted to ground, and the windings of the spindle motor 18 may be shorted to ground by turning on the bottom switches 40. After the shorting interval, the upper switches 40 may be turned on to connect the windings to the supply voltage 24 which essentially drives the windings with a driving voltage at an amplitude proximate the BEMF voltage as illustrated in FIG. 3A.

Figure 3B:
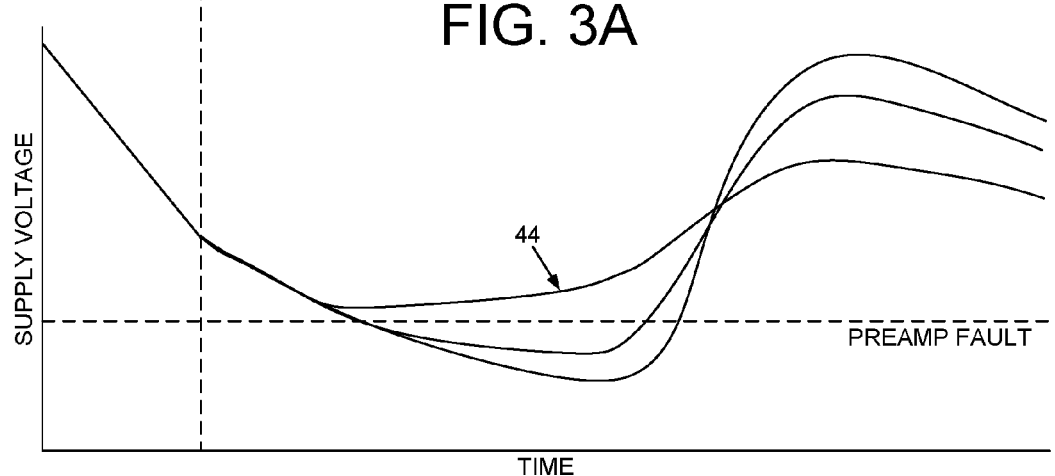
FIG. 3B shows different waveforms representing the supply voltage decreasing due to a power failure and then boosted by the power generated by the spindle motor, wherein in one embodiment the step increments for the driving voltage as shown in FIG. 3A are selected to prevent the supply voltage from falling below a preamp fault threshold.

The prior art technique of shorting/unshorting the windings may not provide sufficient power at the beginning of the power failure event, which may cause the supply voltage to dip below a preamp fault threshold and interrupt a current write operation since the preamp circuit is used to perform the write (e.g., by generating a write current applied to a write element). Accordingly, in one embodiment after shorting the windings to ground for an interval, the amplitude of the driving voltage may be incrementally increased by at least two steps toward the operating amplitude (i.e., toward the amplitude of the BEMF voltage). In one embodiment, the step increment and/or the interval of each step may be configured so as to increase the power generated by the spindle motor earlier during the power failure procedure in order to prevent the supply voltage from falling below the preamp fault threshold. FIG. 3B shows a number of waveforms representing the supply voltage during a power failure for different step increments and/or intervals. For example, certain step increments and/or intervals may still cause the supply voltage to fall below the preamp fault threshold. Accordingly, in one embodiment the step increments and/or intervals may be optimized to provide sufficient power at the beginning of a power failure event, thereby preventing the supply voltage (e.g., waveform 44 in FIG. 3B) from falling below the preamp fault threshold.

FIG. 4A shows a signal waveform representing the driving voltage for the windings according to an embodiment starting at substantially zero, and then incrementally increased by three steps (at each dot) over time. FIG. 4B illustrates the signal waveforms representing the power generated by each winding over time as well as the total power generated by the spindle motor 18. FIGS. 4C-4E show signal waveforms representing the current, driving voltage, and BEMF voltage of each winding (each phase) relative to time as the driving voltage is incrementally increased by the three steps. In this embodiment, the driving voltage applied to each winding comprises a sinusoidal voltage, and the driving voltage applied to each winding comprises a phase corresponding to a phase of the BEMF voltage across each winding. That is, the phase of the BEMF voltage and corresponding amplitude will vary depending on the rotation angle of the spindle motor 18 when a power failure occurs. The current flowing through each winding will also have a specific phase and amplitude when a power failure occurs. As illustrated in FIGS. 4C-4E, reducing the amplitude of the driving voltage to substantially zero and then incrementally increasing the amplitude of the driving voltage causes the current in each winding to reverse polarity, thereby converting the spindle motor 18 into a power generator. FIGS. 4C-4E also illustrate an embodiment wherein the driving voltage is incrementally increased toward the amplitude of the BEMF voltage, and in one embodiment the amplitude of the driving voltage eventually exceeds the BEMF voltage at the last incremental step which, in one embodiment, optimizes the power generation at the beginning of the power failure event.

The amplitude of the driving voltage applied to each winding may be increased incrementally in any suitable manner. In one embodiment, the control circuitry 22 may control the switches 40 as linear amplifiers in order to step increase the amplitude of the driving voltages. In another embodiment, the control circuitry 22 may drive the switches 40 using pulse width modulation (PWM) in order to control an average amplitude for the driving voltages. In addition, the control circuitry 22 may incrementally increase the amplitude of the driving voltage at any suitable step interval.

In one embodiment, the disk 16 as shown in FIG. 2A comprises a plurality of servo sectors $46_0$-$46_N$ that define a plurality of servo tracks 48. The control circuitry 22 may be configured in one embodiment to increase the amplitude of the driving voltage when the head reaches a first servo sector by a first step increment and then step increase the amplitude of the driving voltage when the head reaches a second servo sector following the first servo sector by a second step increment. In one embodiment, the incremental steps shown in FIG. 2B for increasing the amplitude of the driving voltage are configured so as to increase the power generated by the spindle motor at the earlier servo wedges so as to prevent the supply voltage 24 from falling below the preamp fault threshold. The power generated by the spindle motor may be represented as:

$$Pwr = \sum_{k=1}^{N} \sum_{p=A}^{C} w[k] \cdot v_{D,P}[k] \cdot i_p[k] \qquad \text{Eq. (1)}$$

where k represents the servo sector index starting from k=1 as the first servo sector at the beginning of a power failure event, N represents a maximum number of servo sectors per data sector, p represents the phase of the winding (A,B,C), $v_{D,P}[k]$ represents the driving voltage for each winding, $i_p[k]$ represents the current for each winding, and w[k] represents a weighting factor. In one embodiment, the amplitude of the driving voltage $v_{D,P}[k]$ may be configured for each servo sector so as to maximize the above equation given a predetermined weighting w[k] assigned to each servo sector. In one embodiment, the weighting assigned to each servo sector may be represented as:

$$w[k] = \alpha^{-k} \quad \text{Eq. (2)}$$

In this manner the above Eq. (2) assigns a higher weighting to the earlier servo sectors so that the above Eq. (1) generates more power earlier during the power failure procedure to help provide enough power to complete a current write operation before the supply voltage 24 falls below the preamp fault threshold. For example in the embodiment of FIG. 3B, as α increases in Eq. (2) the supply voltage waveform may trend toward waveform 44.

Figure 5A:
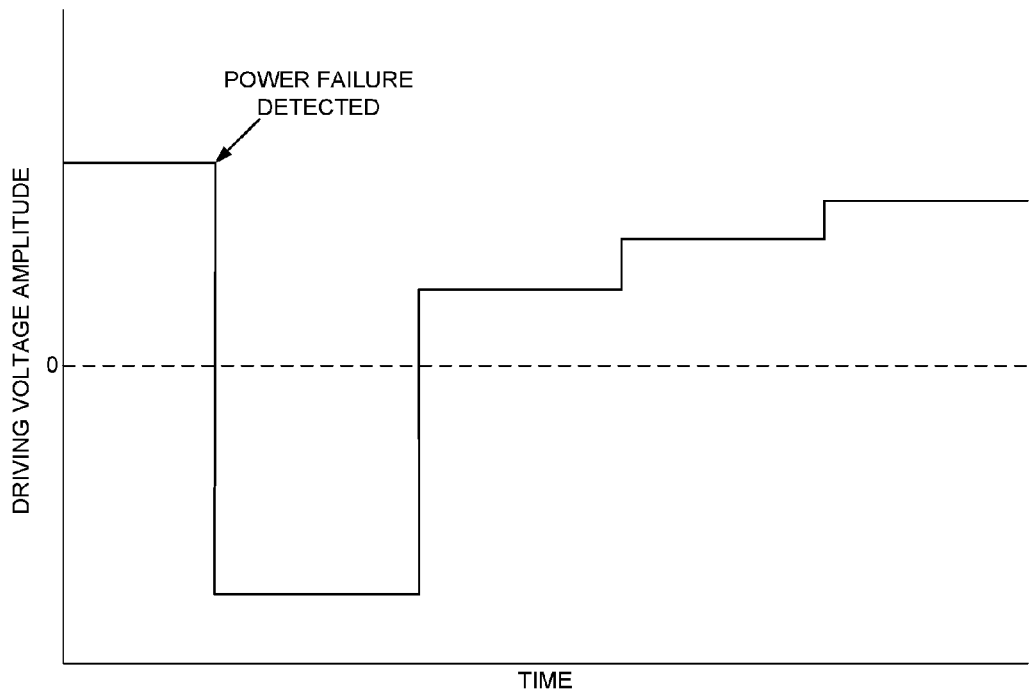
FIG. 5A shows an embodiment wherein when the supply voltage falls below a threshold due to a power failure, the spindle motor is configured into a power generator by at least reversing the polarity of the driving voltage for an interval, reversing the polarity of the driving voltage back to an operating polarity, and then step increasing the amplitude of the driving voltage.

FIG. 5A shows an embodiment wherein when the supply voltage 24 falls below a threshold, the control circuitry 22 may configure the spindle motor 18 into a power generator by at least reversing the polarity of the driving voltage for an interval and then reversing the polarity of the driving voltage back to an operating polarity. This embodiment may cause the current in the windings to reverse polarity faster so that the spindle motor 18 may generate more power earlier during the power failure procedure, which may help prevent the supply voltage from falling below the preamp fault as described above with reference to FIG. 3B. Any suitable technique may be employed to reverse the polarity of the driving voltage, such as by generating a negative supply voltage using the positive supply voltage 24, or by configuring the windings of the spindle motor 18 so as to generate reverse polarity driving voltages across each winding (i.e., use the BEMF voltage of the spindle motor 18 to generate a negative supply voltage).

Figure 5B:
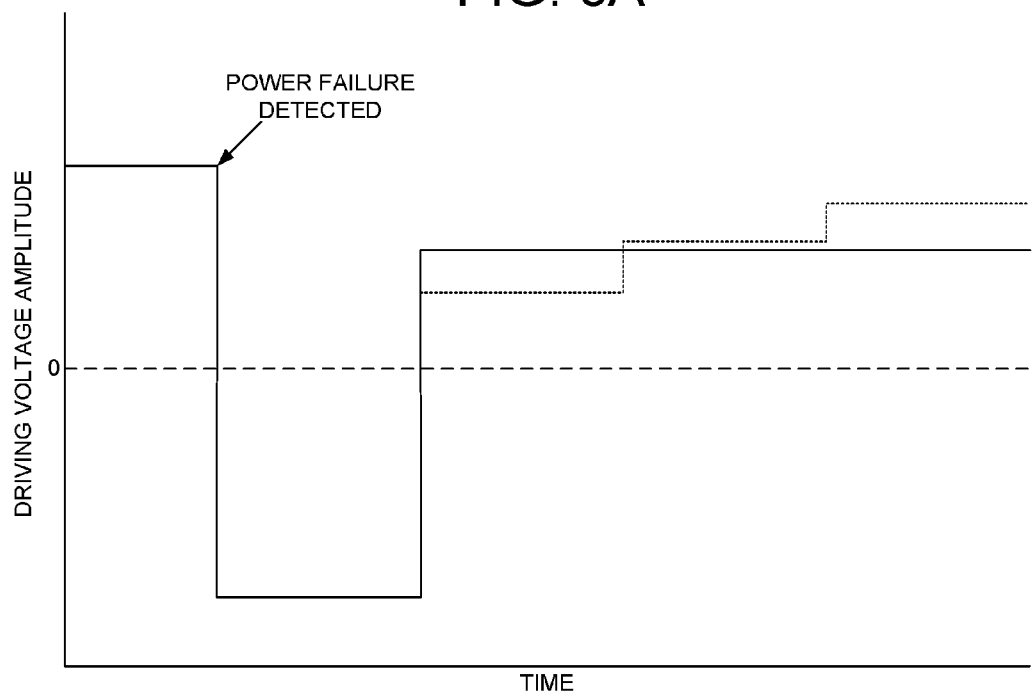
FIG. 5B shows an embodiment wherein after reversing the polarity of the driving voltage back to the operating polarity, the amplitude of the driving voltage is configured to the average of the step increments shown in FIG. 5A.

In the embodiment of FIG. 5A, after reversing the polarity of the driving voltage for each winding, the control circuitry 22 may incrementally increase the amplitude of the driving voltage by at least two steps as described above. That is, the embodiment of FIG. 5A may combine the technique of reversing the polarity of the driving voltages with the technique of step increasing the driving voltages in order to increase the power generated early in the power failure procedure. In another embodiment shown in FIG. 5B, after reversing the polarity of the driving voltages back to the operating polarity, the amplitude of the driving voltages may be incremented by one step and then remain substantially constant in order to reduce the complexity of the power generating algorithm, thereby reserving processor bandwidth for other operations. In one embodiment, the constant amplitude for the driving voltage shown in FIG. 5B may be selected as the average value of the stepped voltages shown in FIG. 5A. That is, the optimal stepped driving voltage may be determined, for example, by optimizing the power generated based on the above Eq. (1), and then the constant amplitude of the driving voltage shown in FIG. 5B configured as the average of the optimal stepped driving voltage.

In one embodiment, the control circuitry 22 may short to ground the center tap 50 of the windings in the spindle motor 18 together with the opposite ends of the windings during the shorting interval. In this embodiment, shorting the center tap 50 of the windings may cause the current in the windings to reverse polarity faster so that the spindle motor 18 may generate more power earlier during the power failure procedure to help ensure a write operation may be completed before unloading the head onto a ramp.

In an embodiment described above, the control circuitry 22 may incrementally increase the amplitude of the driving voltages for each winding at each servo sector (i.e., as part of the servo sector interrupt service routine). In another embodiment, the control circuitry 22 may comprise dedicated hardware (e.g., registers and timers) that may be configured so as to automatically reverse the polarity of the driving voltages and/or step increase the amplitude of the driving voltages at any suitable interval independent of the servo sample rate when a power failure is detected.

In the embodiment described above with reference to FIG. 3B, the step increments and/or intervals for the driving voltage may be optimized to provide sufficient power at the beginning of a power failure event, thereby preventing the supply voltage (e.g., waveform 44 in FIG. 3B) from falling below a preamp fault threshold. In other embodiments, the step increments and/or intervals of the driving voltage may be optimized so as to remain above a different threshold during a power failure, such as a reset threshold that may cause the disk drive to automatically unload the head onto a ramp.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a disk;
    a spindle motor configured to rotate the disk, wherein the spindle motor comprises a plurality of windings;
    a head actuated over the disk; and
    control circuitry powered by a supply voltage, the control circuitry configured to:
    commutate the windings based on a commutation sequence while applying a driving voltage to each winding, wherein the driving voltage comprises an operating polarity during normal operation; and
    when the supply voltage falls below a threshold while the spindle motor is rotating the disk, configure the spindle motor into a power generator by at least reversing the polarity of the driving voltage for an interval and then reversing the polarity of the driving voltage back to the operating polarity.

2. The data storage device as recited in claim 1, wherein after reversing the polarity of the driving voltage back to the operating polarity the control circuitry is further configured to incrementally step increase an amplitude of the driving voltage by at least one step.

3. The data storage device as recited in claim 1, wherein reversing the polarity of the driving voltage back to the operating polarity comprises configuring an amplitude of the driving voltage to substantially equal a back electromotive force (BEMF) voltage across each winding.

4. A method of operating a data storage device, the method comprising:
    commutating windings of a spindle motor configured to rotate a disk based on a commutation sequence while applying a driving voltage to each winding, wherein the driving voltage comprises an operating polarity during normal operation; and
    when a supply voltage falls below a threshold while the spindle motor is rotating the disk, configuring the spindle motor into a power generator by at least reversing the polarity of the driving voltage for an interval and then reversing the polarity of the driving voltage back to the operating polarity.

5. The method as recited in claim 4, wherein after reversing the polarity of the driving voltage back to the operating polarity the method further comprises incrementally step increasing an amplitude of the driving voltage by at least one step.

6. The method as recited in claim 4, wherein reversing the polarity of the driving voltage back to the operating polarity comprises configuring an amplitude of the driving voltage to substantially equal a back electromotive force (BEMF) voltage across each winding.

7. A controller for use in a data storage device comprising a disk, a spindle motor configured to rotate the disk, wherein the spindle motor comprises a plurality of windings, and a head actuated over the disk,
    the controller comprising control circuitry powered by a supply voltage, the control circuitry configured to:
    commutate the windings based on a commutation sequence while applying a driving voltage to each winding, wherein the driving voltage comprises an operating polarity during normal operation; and
    when the supply voltage falls below a threshold while the spindle motor is rotating the disk, configure the spindle motor into a power generator by at least reversing the polarity of the driving voltage for an interval and then reversing the polarity of the driving voltage back to the operating polarity.

8. The controller as recited in claim 7, wherein after reversing the polarity of the driving voltage back to the operating polarity the control circuitry is further configured to incrementally step increase an amplitude of the driving voltage by at least one step.

9. The controller as recited in claim 7, wherein reversing the polarity of the driving voltage back to the operating polarity comprises configuring an amplitude of the driving voltage to substantially equal a back electromotive force (BEMF) voltage across each winding.

* * * * *